(12) United States Patent
Gravenites et al.

(10) Patent No.: US 10,324,697 B2
(45) Date of Patent: Jun. 18, 2019

(54) SYSTEM AND METHOD FOR IMPORTING AND EXTORTING AN INTEGRATION FLOW IN A CLOUD-BASED INTEGRATION PLATFORM

(71) Applicant: Oracle International Corporation, Redwood Shores, CA (US)

(72) Inventors: Greg Gravenites, Littleton, CO (US); Rajan Modi, Highlands Ranch, CO (US); Arif Rafique, Denver, CO (US); Muthu Palanisamy, Tamil Nadu (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 335 days.

(21) Appl. No.: 15/174,658

(22) Filed: Jun. 6, 2016

(65) Prior Publication Data

US 2016/0357535 A1     Dec. 8, 2016

Related U.S. Application Data

(60) Provisional application No. 62/171,162, filed on Jun. 4, 2015.

(51) Int. Cl.
*G06F 8/60* (2018.01)
*G06F 8/34* (2018.01)
*G06F 9/455* (2018.01)

(52) U.S. Cl.
CPC .................. *G06F 8/60* (2013.01); *G06F 8/34* (2013.01); *G06F 9/45504* (2013.01)

(58) Field of Classification Search
CPC ........... G06F 8/60; G06F 8/34; G06F 9/45504
(Continued)

(56) References Cited

U.S. PATENT DOCUMENTS 8,099,480 B1 * 1/2012 Muthusrinivasan ... G06Q 10/06
706/45
8,412,768 B2    4/2013 Rajaraman
(Continued)

OTHER PUBLICATIONS

Oracle® Fusion Middleware, An Oracle White Paper, Simplifying Cloud Integration, Copyright © 2014, Jan. 2014, 18 pages.
(Continued)

*Primary Examiner* — Emerson C Puente
*Assistant Examiner* — Sen Thong Chen
(74) *Attorney, Agent, or Firm* — Tucker Ellis LLP

(57) ABSTRACT

In accordance with an embodiment, described herein is a system and method for exporting and importing integration flows in a cloud-based integration service. The cloud-based integration service includes a web interface application for creating an integration flow, and a runtime for executing the integration flow. The web interface application can provide an import interface and an import logic component, and an export interface and an export logic component. The export logic component can be configured to export an integration flow and its dependent resources, regardless of their lock states, and with secured information removed from the dependent resources. The import logic component can be configured to import an integration flow and its dependent resources; and perform a plurality of checks and validations for each dependent resource being imported, to determine whether to create the dependent resource in the system, or keep an existing dependent resource in the system.

20 Claims, 12 Drawing Sheets

(58) Field of Classification Search
USPC .......................................................... 717/177
See application file for complete search history.

(56) References Cited

U.S. PATENT DOCUMENTS

| | | | |
|---|---|---|---|
| 8,788,931 B1 | 7/2014 | Chen | |
| 9,116,777 B1* | 8/2015 | Kiradjiev | G06Q 10/06 |
| 2002/0116531 A1 | 8/2002 | Chu | |
| 2007/0245013 A1* | 10/2007 | Saraswathy | G06F 21/604 |
| | | | 709/223 |
| 2009/0125833 A1 | 5/2009 | Abernethy | |
| 2009/0198548 A1* | 8/2009 | Kohler | G06Q 10/06 |
| | | | 705/7.27 |
| 2010/0042670 A1 | 2/2010 | Kamalakantha | |
| 2011/0225565 A1* | 9/2011 | van Velzen | G06F 9/5038 |
| | | | 717/114 |
| 2012/0030275 A1 | 2/2012 | Boller | |
| 2013/0041980 A1* | 2/2013 | Wickman | G06Q 10/06 |
| | | | 709/217 |
| 2014/0100922 A1 | 4/2014 | Aycock | |
| 2014/0129265 A1 | 5/2014 | Arena | |
| 2015/0082196 A1 | 3/2015 | Berger | |
| 2015/0188973 A1 | 7/2015 | Kacmarcik | |
| 2015/0317575 A1* | 11/2015 | Walker | G06Q 10/067 |
| | | | 705/7.27 |
| 2016/0011905 A1 | 1/2016 | Mishra | |
| 2016/0182309 A1 | 6/2016 | Maturana | |
| 2016/0196532 A1 | 7/2016 | De | |
| 2016/0359689 A1 | 12/2016 | Herreria | |
| 2017/0054948 A1 | 2/2017 | Angel | |
| 2017/0288940 A1* | 10/2017 | Lagos | H04L 41/024 |

OTHER PUBLICATIONS

United States Patent and Trademark Office, Notice of Allowance and Issue Fee(S) Due dated Mar. 25, 2019 for U.S. Appl. No. 15/174,661, 12 Pages.

* cited by examiner

SYSTEM AND METHOD FOR IMPORTING AND EXTORTING AN INTEGRATION FLOW IN A CLOUD-BASED INTEGRATION PLATFORM

CLAIM OF PRIORITY

This application claims the benefit of priority to U.S. Provisional Application titled "SYSTEM AND METHOD FOR EXPORTING AND IMPORTING AN INTEGRATION CLOUD SERVICE INTEGRATION FLOW", Application No. 62/171,162, filed Jun. 4, 2015, which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud services, and are particularly related to a system and method for exporting and importing an integration flow in a cloud-based integration service.

BACKGROUND

The rapid shift from on-premises applications to a hybrid mix of Software-as-a-Service (SaaS) and on-premises applications has introduced challenges for companies attempting to simplify enterprise application integration. Integration platform as a service (iPaaS) can provide a set of cloud-based tools to address these challenges. An iPaaS platform can provide a design time for users to design integration flows. These integration flows may have to be migrated to a different environment, for example, for testing.

SUMMARY

In accordance with an embodiment, described herein is a system and method for exporting and importing integration flows in a cloud-based integration service. The cloud-based integration service includes a web interface application for creating an integration flow, and a runtime for executing the integration flow. The web interface application can provide an import interface and an import logic component, and an export interface and an export logic component. The export logic component can be configured to export an integration flow and its dependent resources, regardless of their lock states, and with secured information removed from the dependent resources. The import logic component can be configured to import an integration flow and its dependent resources; and perform a plurality of checks and validations for each dependent resource being imported, to determine whether to create the dependent resource in the system, or keep an existing dependent resource in the system.

DETAILED DESCRIPTION

Integration platform as a service, for example, Oracle Integration Cloud Service (ICS), can provide a cloud-based platform for building and deploying integrations flows that connect applications residing in the cloud or on-premises.

Figure 1:
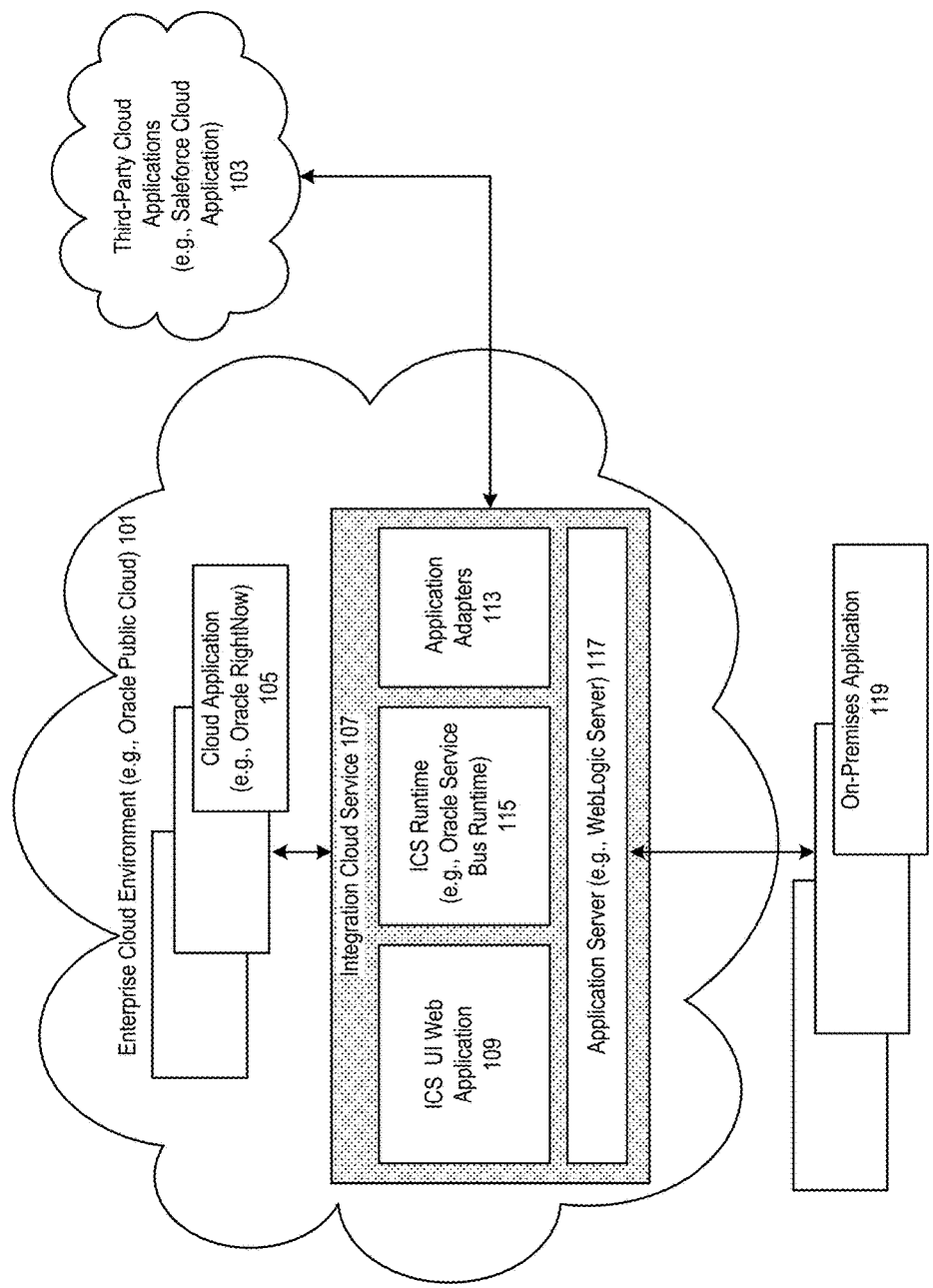
FIG. 1 illustrates an integration cloud service (ICS) in accordance with an embodiment.

FIG. 1 illustrates an integration cloud service in accordance with an embodiment.

As shown in FIG. 1, an ICS 107 can provide a cloud-based integration service for designing, executing, and managing ICS integration flows. The ICS can include a web application 109 and an ICS runtime 115 executing on an application server 117 in an enterprise cloud environment (for example, Oracle Public Cloud) 101. The web application can provide a design time that exposes a plurality of user interfaces for a user to design, activate, manage, and monitor an ICS integration flow. An activated ICS integration flow can be deployed and executed on the ICS runtime.

In accordance with an embodiment, a plurality of application adapters 113 can be provided to simplify the task of configuring connections to a plurality of applications, by handling the underlying complexities of connecting to those applications. The applications can include enterprise cloud applications of the ICS vendor (for example, Oracle RightNow) 105, third-party cloud applications (for example, Salesforce) 103, and on-premises applications 119. The ICS can expose simple object access protocol (SOAP) and representational state transfer (REST) endpoints to these applications for use in communicating with these applications.

In accordance with an embodiment, an ICS integration flow (or ICS integration) can include a source connection, a target connection, and field mappings between the two connections. Each connection can be based on an application adapter, and can include additional information required by the application adapter to communicate with a specific instance of an application.

In accordance with an embodiment, an ICS integration flow and a plurality of other required artifacts (for example, JCA and WSDL files) can be compiled into an ICS project, which can be deployed and executed in the ICS runtime. A plurality of different types of integration flow patterns can be created using the web UI application, including data mapping integration flows, publishing integration flows, and subscribing integration flows. To create a data mapping integration flow, an ICS user can use an application adapter or an application connection to define a source application and a target application in the development interface, and define routing paths and data mappings between the source and target application. In a publishing integration flow, a source application or a service can be configured to publish messages to the ICS through a predefined messaging service. In a subscribing integration flow, a target application or service can be configured to subscribe to messages from the ICS through the messaging service.

Figure 2:
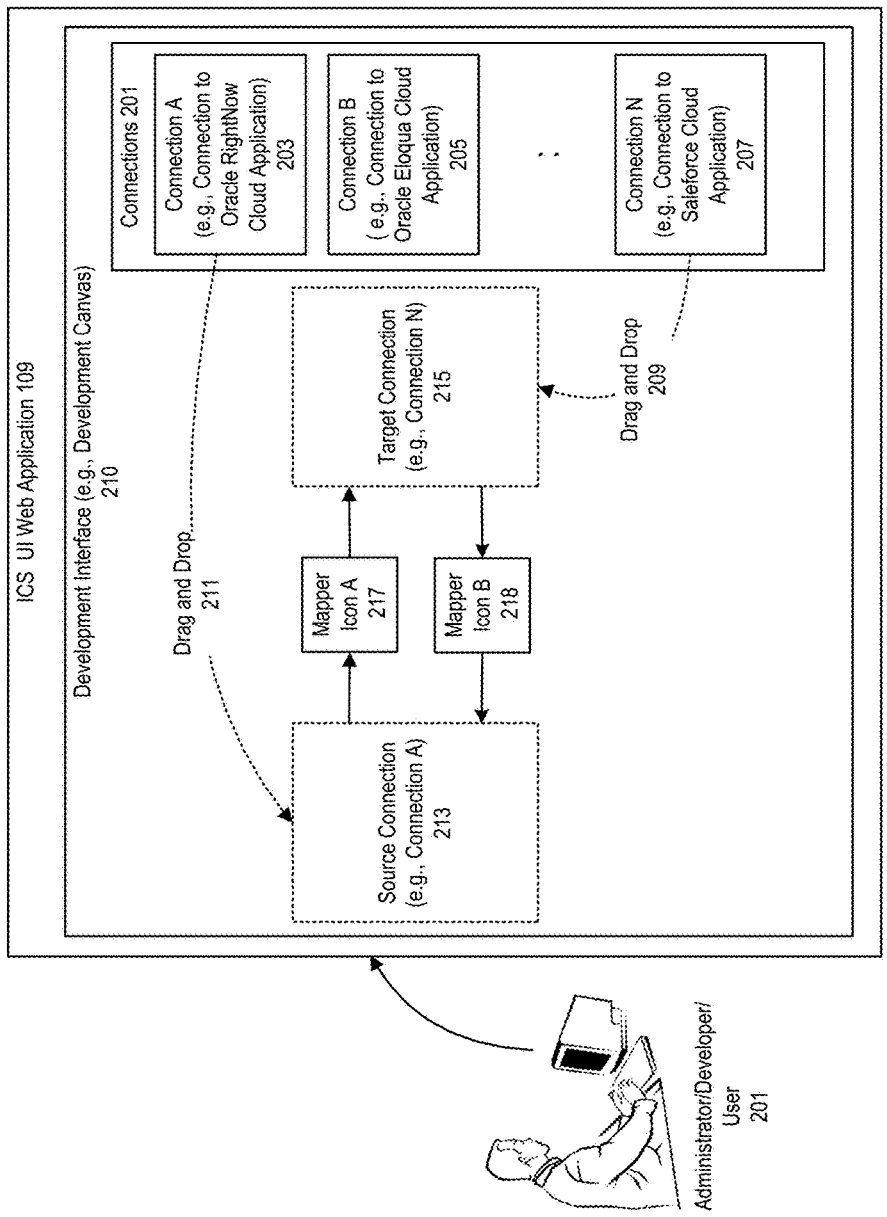
FIG. 2 illustrates an ICS design time, in accordance with an embodiment.

FIG. 2 illustrates an ICS design time, in accordance with an embodiment.

In accordance with an embodiment, a development interface (e.g., a development canvas) 210 in the web UI application can be used by a user to create an ICS integration flow, using a plurality of existing connections 201, for example, connection A 203, connection B 205 and connection N 207.

As shown in FIG. 2, a particular connection (for example, connection A) can be dragged and dropped 211 to the development interface as a source connection 213, and connection N can be dragged and dropped 209 to the development interface as a target connection 215. The source connection can include information required to connect to a source application, and can be used by the ICS to receive requests from the source application (for example, an Oracle RightNow cloud application). The target connection can include information required to connect to a target application (for example, a Salesforce cloud application), and can be used by the ICS to send requests to the target application.

In accordance with an embodiment, the source and target connections can be further configured to include additional information. For example, the additional information can include types of operations to be performed on data associated with a request, and objects and fields against those operations.

In accordance with an embodiment, once the source and target connections are configured, mappers between the two connections can be enabled, and mapper icons (for example, mapper icon A 217 and mapper icon B 218) can be displayed for use in opening the mappers, so that the user can define how information is transferred between a source and target data objects for both the request and response messages.

In accordance with an embodiment, the mappers can provide a graphical user interface for the user to map items (for example, fields, attributes, and elements) between the source and target applications by dragging a source item onto a target item. When a mapper for a request or response message in an ICS integration flow is opened, the source and target data objects can be automatically loaded using the source and target connections.

In accordance with an embodiment, lookups can be provided to facilitate the creation of mappings. As used herein, lookups are reusable mappings for different codes and terms used in applications to describe the same item. For example, one application uses a specific set of codes to describe countries, while another application uses a different set of codes to describe the same countries. Lookups can be used to map these different codes across the different applications. A lookup can be represented by a table of connectors and domain value mappings; and can be edited, cloned, imported, exported and deleted.

Connectors

As used herein, a connector can represent a pre-built application-specific code used to assist an integration flow developer during the design time, and to automate activation of an integration flow during deployment time. A connector can act as a conduit between an application and the ICS during execution time.

In accordance with an embodiment, during design time, a connector can be used by an integration flow developer to discover various artifacts such as schemas, services, and events available in an associated application, for use by the developer to configure the associated application in an efficient and non-error prone manner.

In accordance with an embodiment, a connector's configuration abilities can differ, depending upon the role played by the associated application in an integration flow. When the associated application is a target, service provider or subscriber, the connector can generate interfaces (WSDLs and Schemas) specific to an object or action configured for the integration flow to work on. During runtime, the ICS can interface with the application based on the generated interfaces.

In accordance with an embodiment, when the associated application is a source, consume, or publisher, the connector can generate the interface for the associated application, so that the associated application can use the generated interface to communicate with the ICS.

During activation time, connectors can be used by the ICS to send the activation requests to their associated applications, so that the source and target application can use the connectors to perform necessary wiring between each application and the ICS, and that the source application can start publishing events.

Exporting and Importing Integration Flows

A user may need to migrate an integration flow to a different environment or system. For example, an integration flow can be exported from a source environment as a Java archive file (JAR) to an interactive development tool environment (for example, Oracle JDeveloper) for advanced extensible stylesheet mapping tasks, such as creating variables or using templates. After the tasks are completed, the integration flow can be imported back into the source environment. For another example, a quality assurance (QA) environment can import an integration flow from a test environment, test the integration flow, and export it to a production environment for deployment.

In accordance with an embodiment, the system can be used to export and import integration flows in a cloud-based integration service. The cloud-based integration service includes a web interface application for creating an integration flow, and a runtime for executing the integration flow. The web interface application can provide an import interface and an import logic component, and an export interface and an export logic component. The export logic component can be configured to export an integration flow and its dependent resources, regardless of their lock states, and with secured information removed from the dependent resources. The import logic component can be configured to import an integration flow and its dependent resources; and perform a plurality of checks and validations for each dependent resource being imported, to determine whether to create the dependent resource in the system, or keep an existing dependent resource in the system.

Figure 3:
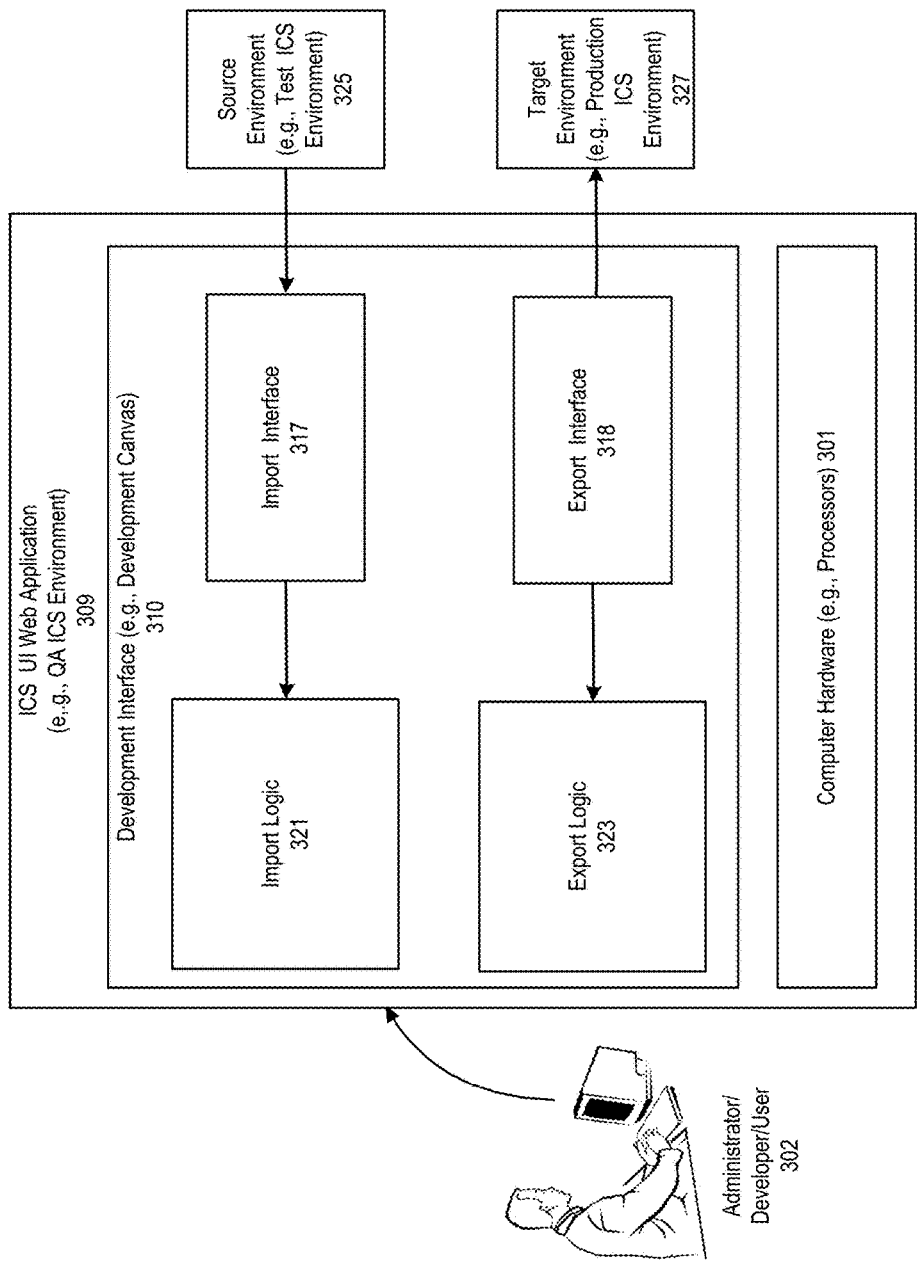
FIG. 3 illustrates a system for exporting and importing an integration flow in an ICS, in accordance with an embodiment.

FIG. 3 illustrates a system for exporting and importing an integration flow in an ICS, in accordance with an embodiment.

As shown in FIG. 3, a web interface application 309 executing on computer hardware (e.g., microprocessors) 301 can include a development interface 310, which further includes an import interface 317 and an associated import logic component 321, an export interface 318 and an associated export logic component 323.

In accordance with an embodiment, the web interface application can be part of a integration cloud service in a QA environment, wherein an integration flow can be imported from a source environment (for example, a test environment) 325, and exported to a target environment (for example, a production environment) 327. The integration flow can be exported as an inventory archive (.IAR) file.

In accordance with an embodiment, to export an integration flow, a user 302 can login to the system, use the export interface to select an integration flow, enter a target ICS in the target environment as the target location, and confirm the exporting action. If the export is successful, the integration flow can be exported to the target ICS.

In accordance with an embodiment, the export interface can invoke the associated export logic component in exporting the integration flow. The export logic component can determine how to export an integration flow, as illustrated by the pseudocode in Listing 1 below.

Listing 1

```
for each dependent Connnection
//Export regardless of lock state
update export Connection Status & Percent Complete; set both to blank values
export Connection; package in .IAR
for each dependent Lookup
//Export regardless of lock state
export Lookup; package in .IAR
//Export regardless of Integration lifecycle state or lock state
export Integration; package in .IAR
```

As shown in Listing 1, when exporting an integration flow, the connections, lookups, and integration flow itself can be exported regardless of their lock state, while sensitive information such as security information can be removed.

In accordance with an embodiment, the import interface can be used to display available integration flows for importing, receive a user's selection for an integration flow to import, and confirm the importing action. If the integration flow selected for importing already exists in the system, the system can prompt the user to select whether to replace the integration flow or skip the importing action.

In accordance with an embodiment, the import logic component associated with the import interface can be invoked to determine how to import an integration flow, as illustrated by the pseudocode in Listing 2 below.

Listing 2

```
if Integration exists in system
    if Integration is in Activation State or locked state
        abort import
    if user wants to overwrite
        set overwrite flag to true
    else
        abort import
//Validate/import lookups
for each Lookup being imported
    if Lookup does NOT exist in system
        if Connectors used by Lookup exist in system
            Create Lookup in system
```

-continued

Listing 2

```
        else
            //Lookup is incompatible with system
            abort import and rollback any changes
    else
        //Lookup exists in system
        if Connectors used Lookup in import is subset of the
            Connectors used by Lookup in system
            //Lookups are compatible
            //NOP; existing Lookups are NOT overwritten
        else
            //Lookups are incompatible
            abort import and rollback any changes
//Validate/import Connections
for each Connection
    if Connection does not exist in system
        if Connector used by Connection exists in system
            Create Connection in system
            update Connection - recalculate and persist connection
            status and percent complete
            //need to call common code to re0-calculate
        else
            //Connection is incompatible with system
            abort import and rollback any changes
    else
        //Connection exists in system
        if Connector used by Connection in import is same as
            Connector used by Connection in system
            //Connections are compatible
            //NOP; existing Connections are NOT overwritten
        else
            //Connections are incompatible
            abort import and rollback any changes
//Import Integration Flow
if overwrite flag is true
    update/replace Integration
else
    create/import Integration
//Update Integration status (% complete is not modified)
if status is activated or activation-failed
    set status to configured
else
    //NOP- status is same as exported value
```

Figure 4:
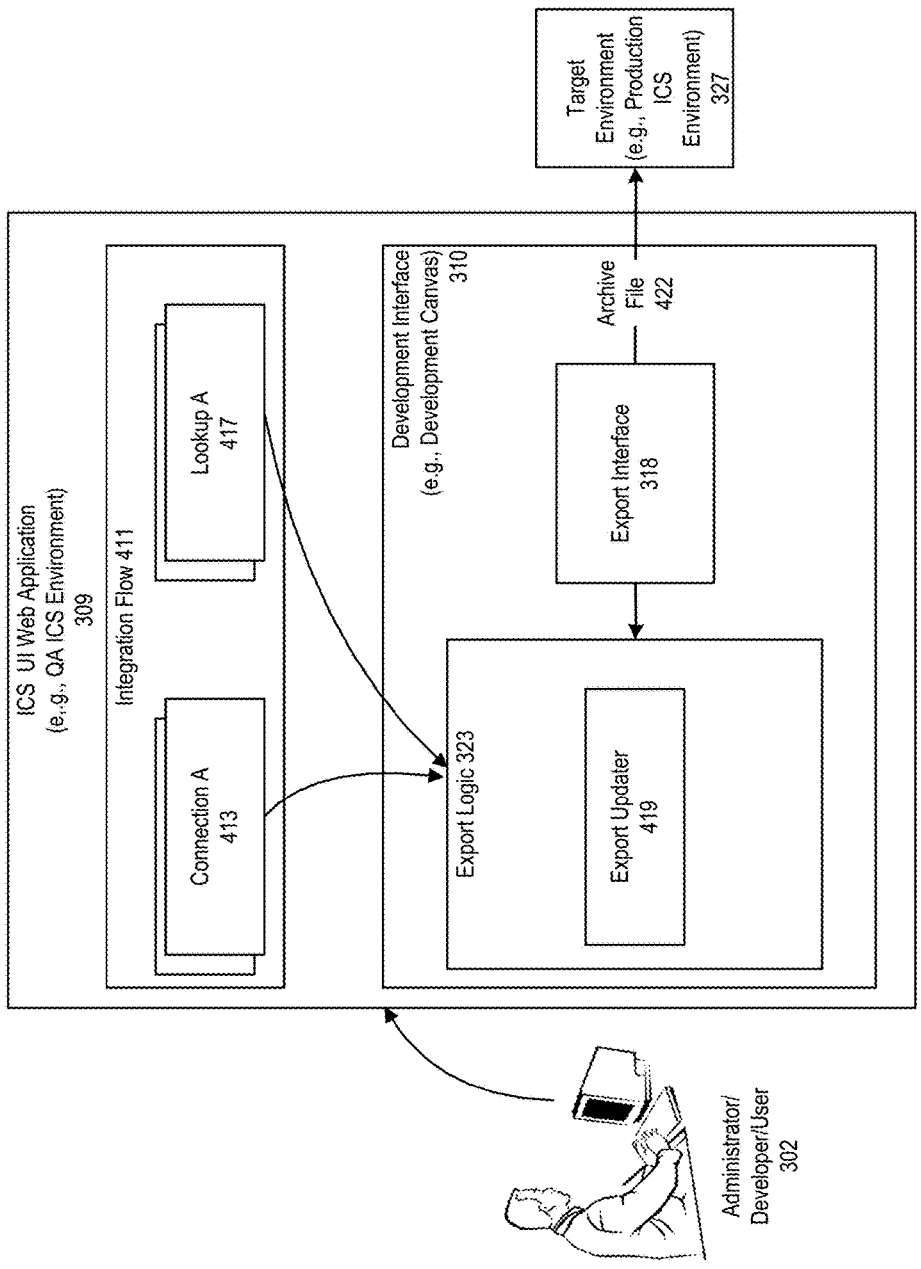
FIG. 4 further illustrates a system for exporting and importing an integration flow in an ICS, in accordance with an embodiment.

FIG. 4 further illustrates a system for exporting and importing an integration flow in an ICS, in accordance with an embodiment.

As shown in FIG. 4, an integration flow 411 can be selected for exporting. The integration flow can include one or more connections, for example, connection A 413, and one or more lookups, for example, lookup A 417.

In accordance with an embodiment, when the system receives a confirmation from the user that the exporting can proceed, the export logic component can be invoked to perform a series of steps on the integration flow to be exported.

In accordance with an embodiment, the export logic component can determine whether the integration flow has a dependent connection, or a dependent lookup. If the integration flow includes either a dependent lookup or a dependent connection, the export logic component can write the lookup or connection to an archive file, for example, an inventory archive file (JAR file). If the integration flow does not include a dependent connection or a dependent lookup, the export logic component can proceed to write the integration flow itself to the archive file.

As further shown in FIG. 4, the export logic component can include an export updater 419, which can be used to update the status of any dependent connection, and percentage complete information of the connection. The export updater can remove the values for the percentage complete information, and the status of any dependent connection. By updating the connection status information, any sensitive information such as security information associated with a dependent connection can be removed.

In accordance with an embodiment, the integration flow and its associated dependent connections and lookups can be written into an archive file 422 and exported to the target system.

Figure 5:
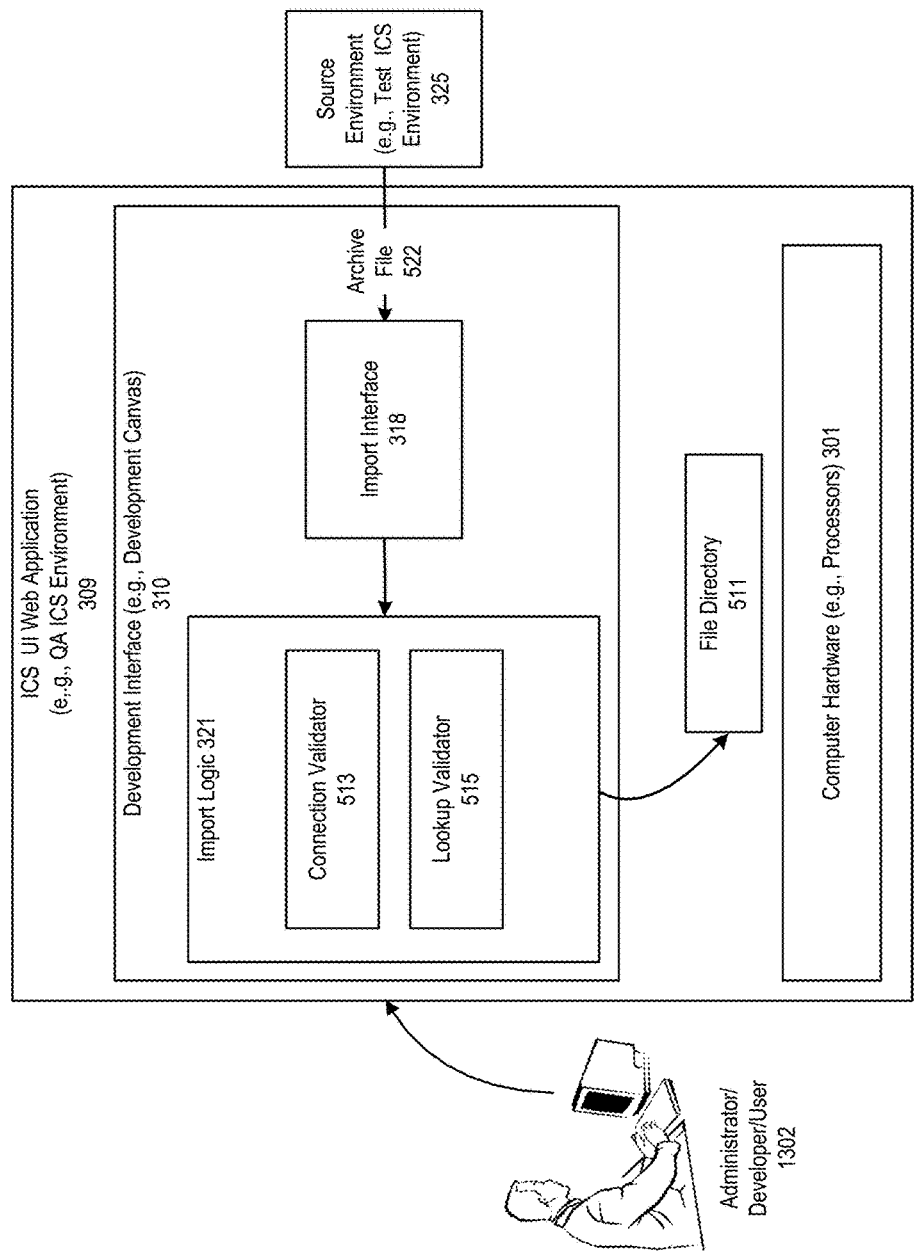
FIG. 5 further illustrates a system for exporting and importing an integration flow in an ICS, in accordance with an embodiment.

FIG. 5 further illustrates a system for exporting and importing an integration flow in an ICS, in accordance with an embodiment.

As shown in FIG. 5, an archive file 522 containing an integration flow to be imported can be selected at the import interface. After receiving a confirmation to import the archive file, the system can invoke the import logic component to perform a series of operations to validate the integration flow, any dependent connections and lookups.

In accordance with an embodiment, the import logic component can include a connection validator 513, and a lookup validator 515. For each connection to be imported, the connection validator can determine if that connection already exists in the system, and it does, whether that connection is compatible with the system. Similarly, the lookup validator can determine, for each lookup to be imported, whether that lookup already exists in the system, and it does, whether that lookup is compatible with the system.

As shown in FIG. 5, after the integration flow is imported into the system it can be persisted into a file directory 511.

Figure 6:
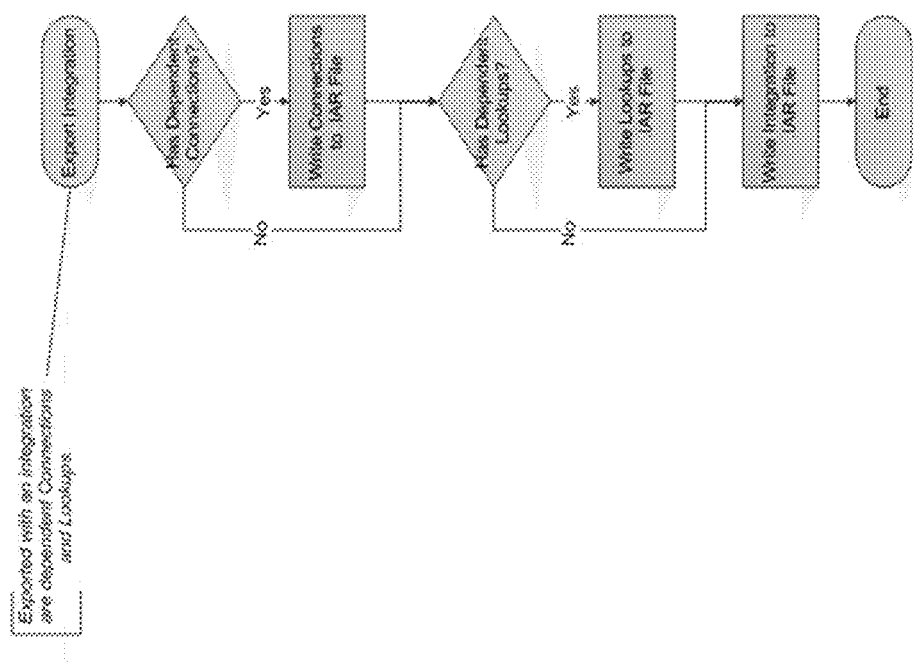
FIG. 6 illustrates a flow chart for exporting an integration flow to a target ICS environment, in accordance with an embodiment.

FIG. 6 illustrates a flow chart for exporting an integration flow to a target ICS environment, in accordance with an embodiment.

As shown in FIG. 6, dependent connections and lookups are exported with the integration flow in an archived file. When selecting an integration flow for exporting, the system can check whether the integration flow includes a connection or a lookup. If either a lookup or a connection is included in the integration flow, the system can write the connection or lookup to an archive file, and export the archive file.

In accordance with an embodiment, the integration flow and each of its dependent resources are exported regardless whether they are locked or unlocked.

Figure 7A:
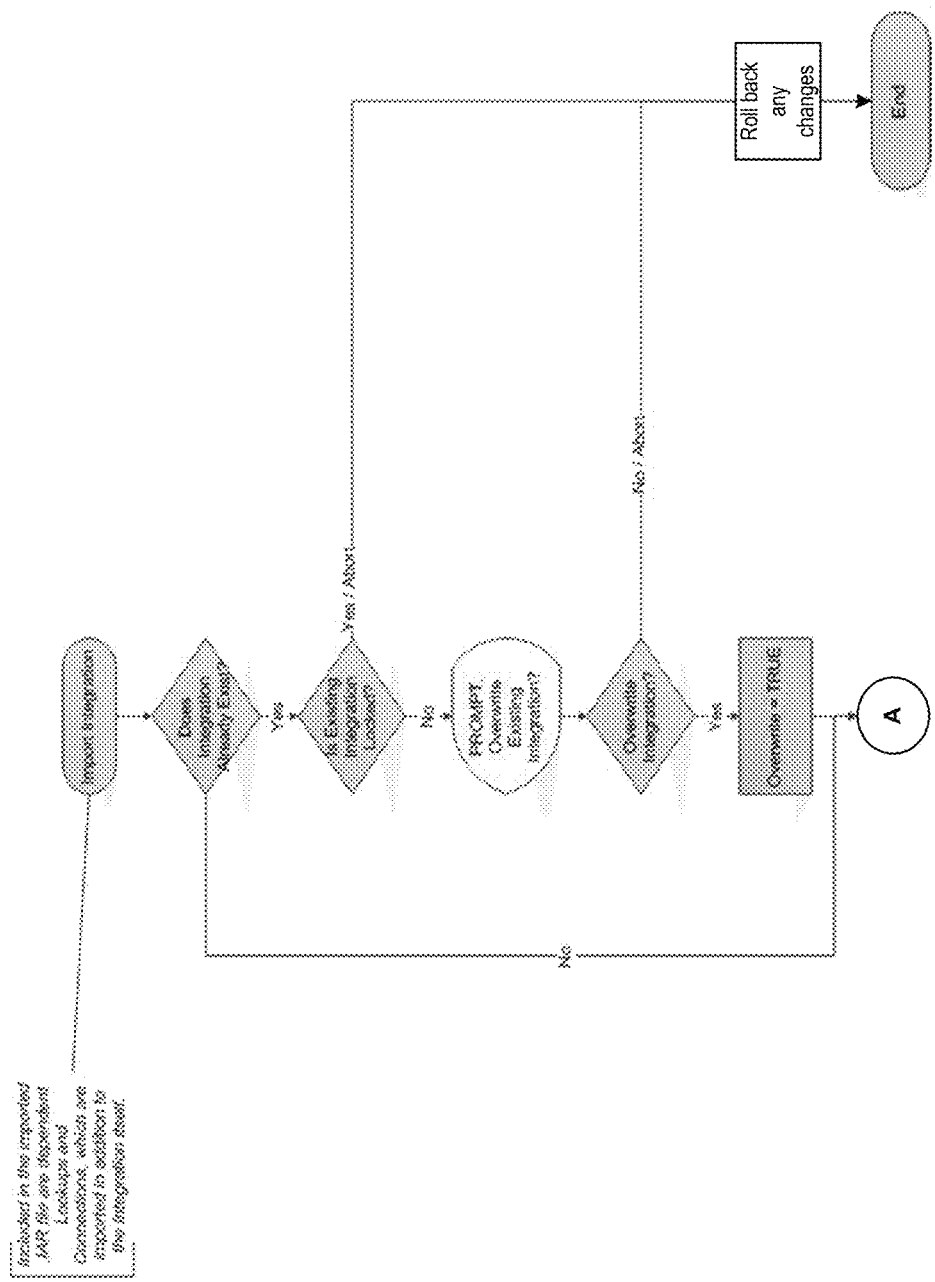
FIGS. 7A-7C illustrate a flow chart for importing an integration flow from a source ICS environment, in accordance with an embodiment.
Figure 7B:
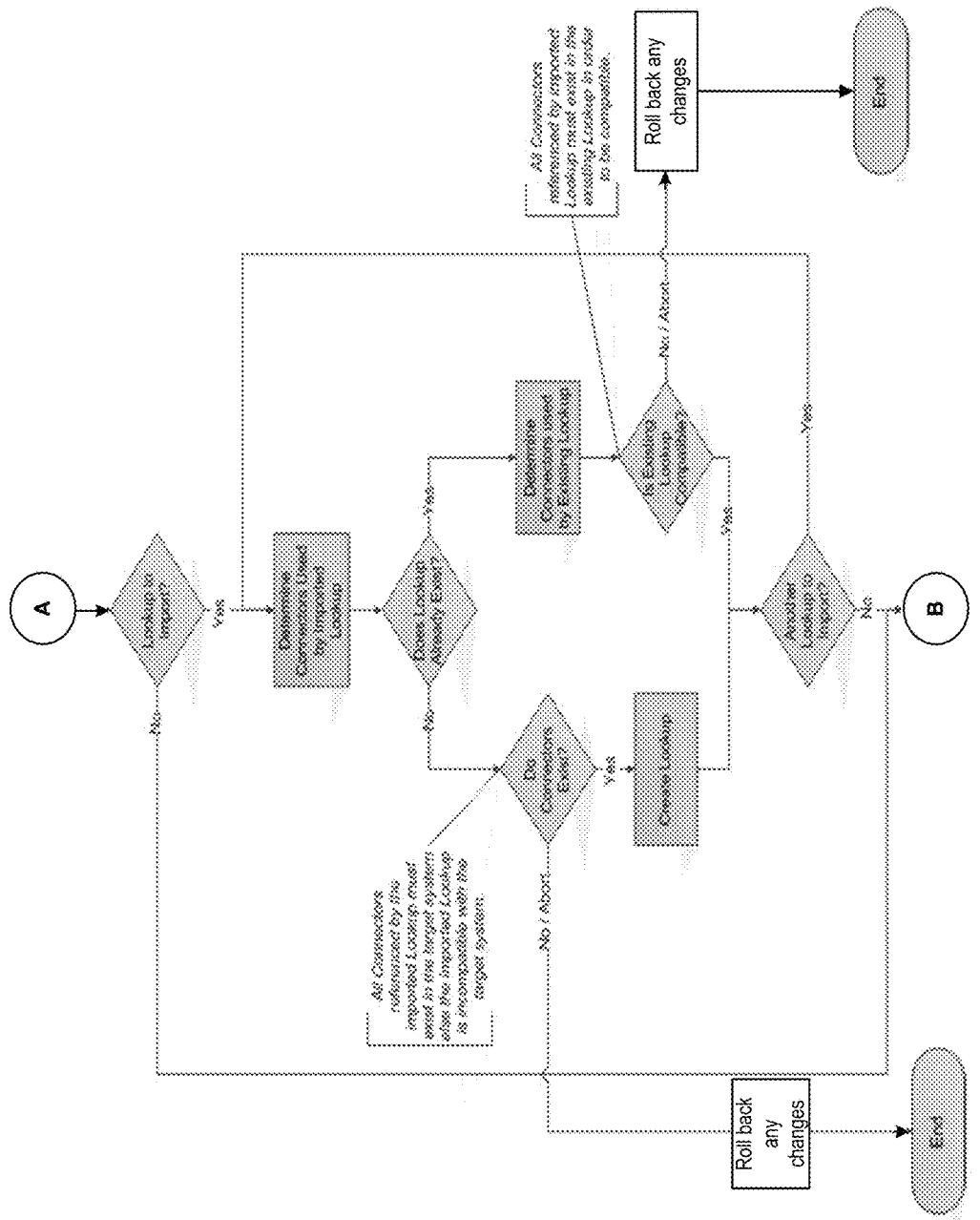
Figure 7C:
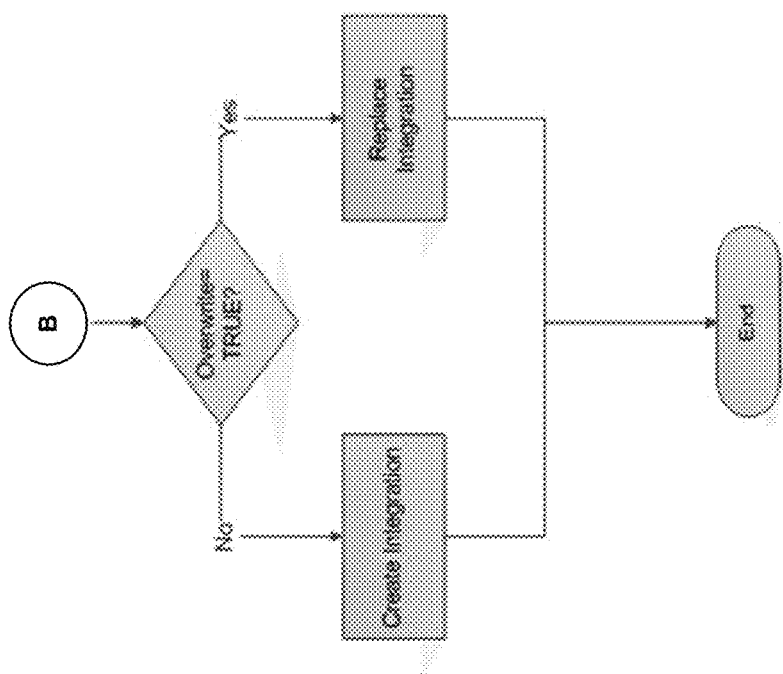

FIGS. 7A-7C illustrate a flow chart for importing an integration flow from a source ICS environment, in accordance with an embodiment.

As shown in FIGS. 7A-7C, when importing an integration flow, the system can determine whether the integration flow exists in the system, and if it does, the system can subsequently determines if the integration is locked. If it is not locked, the system can prompt a user to overwrite the existing integration flow. If it is locked, the importing operation can abort.

In accordance with an embodiment, a dependent connection or lookup is not imported automatically. For each dependent resource being imported, the system can perform a plurality of checks and validations, to determine whether to create the dependent resource in the system, or keep an existing dependent resource in the system.

Figure 8A:
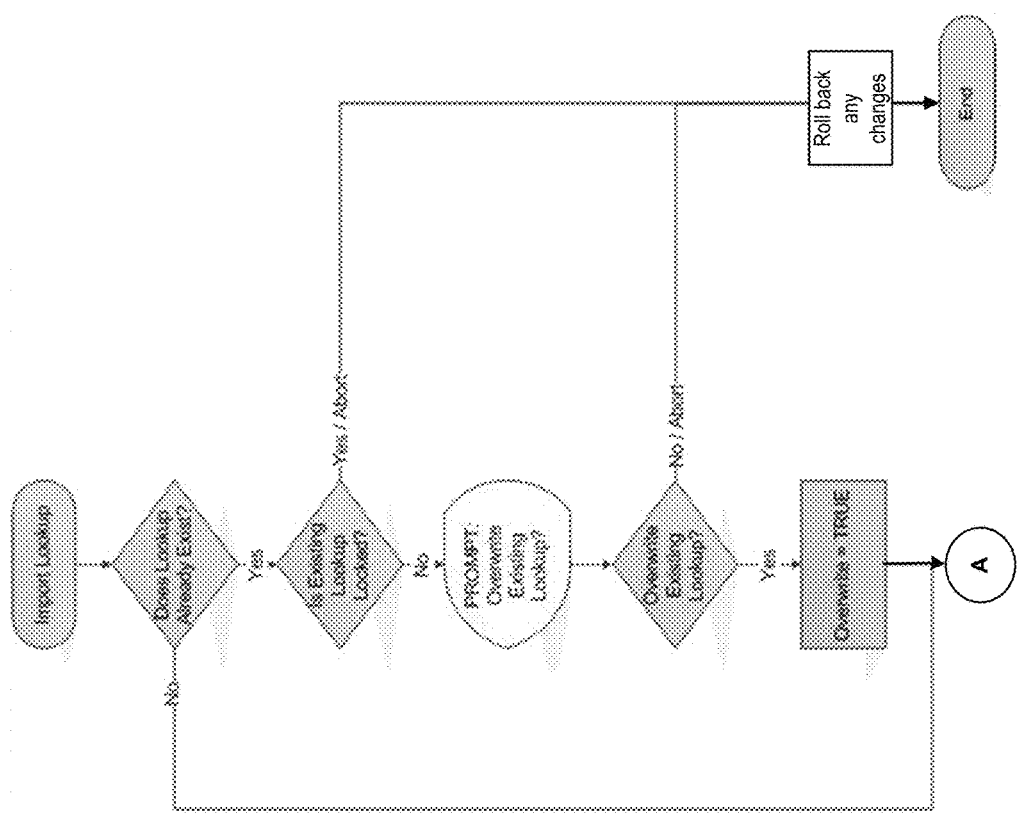
FIGS. 8A-8B illustrate a flow chart for importing lookups from a source ICS environment, in accordance with an embodiment.
Figure 8B:
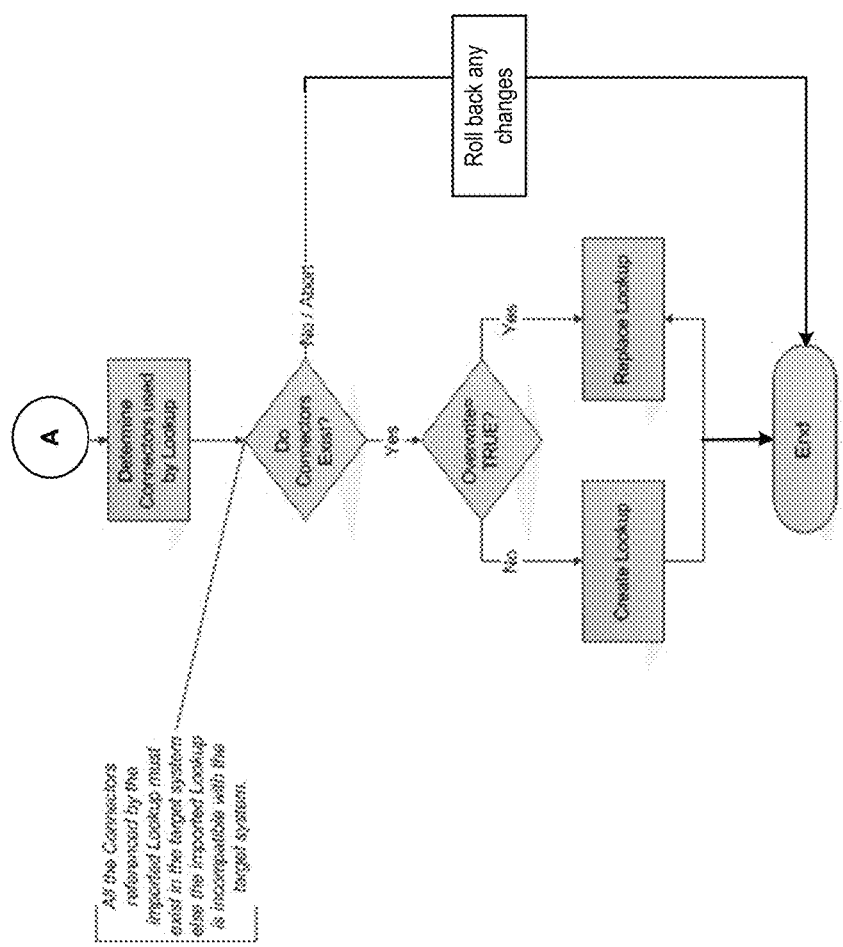

FIGS. 8A-8B illustrate a flow chart for importing lookups from a source ICS environment, in accordance with an embodiment.

As shown in FIGS. 8A-8C, all connections referenced by an imported lookup need to be in the system. Otherwise, the imported lookup may not be compatible with the system.

Figure 9:
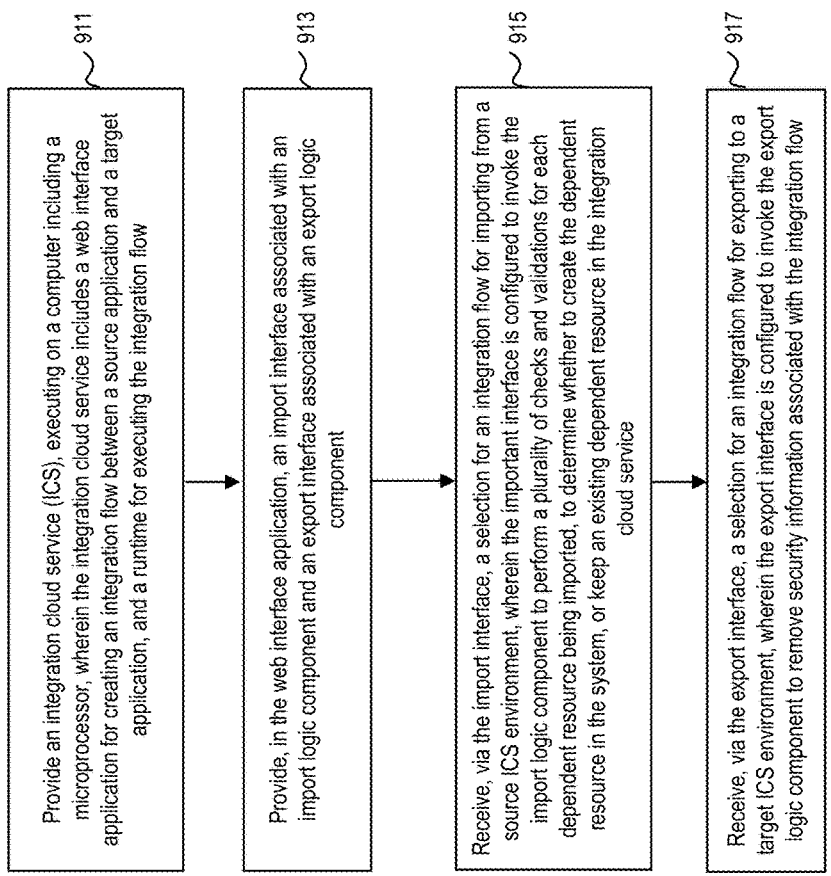
FIG. 9 illustrates a method for exporting and importing an integration flow in an ICS, in accordance with an embodiment.

FIG. 9 illustrates a method for exporting and importing an integration flow in an ICS, in accordance with an embodiment.

As shown in FIG. 9, at step 911, an integration cloud service is provided on a computer including a microprocessor, wherein the integration cloud service includes a web interface application for creating an integration flow between a source application and a target application, and a runtime for executing the integration flow.

At step 913, an import interface associated with an import logic component and an export interface associated with an export logic component, are provided in the web interface application.

At step 915, the import interface receives a selection for an integration flow for importing from a source ICS environment, wherein the important interface is configured to invoke the import logic component to perform a plurality of checks and validations for each dependent resource being imported, to determine whether to create the dependent resource in the system, or keep an existing dependent resource in the integration cloud service.

At step 917, the export interface receives a selection for an integration flow for exporting to a target ICS environment, wherein the export interface is configured to invoke the export logic component to remove security information associated with the integration flow.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for exporting and importing integration flows in a cloud-based integration service, comprising:
   a computer including one or more microprocessors; and
   a cloud service, executing on the computer,
   wherein the cloud service includes a web interface application for creating an integration flow between a source application and a target application, and a runtime for executing the integration flow, wherein the web interface application provides an import interface associated with an import logic component and an export interface associated with an export logic component, wherein the import interface is configured to:
- receive a selection for an integration flow to be imported from a source environment;
- invoke the import logic component to perform a plurality of checks and validations for a dependent resource of the integration flow to be imported, to determine based on a presence of the dependent resource of the integration flow to be imported as an existing resource in the system whether to create the dependent resource of the integration flow to be imported as a new dependent resource in the system, or retain an existing dependent resource in the system; and
- invoke the import logic component to selectively create the new dependent resource in the system or retain the existing resource in the system, wherein the export interface is configured to:
- select an integration flow to be exported to a target environment;
- invoke the export logic component to write the selected integration flow to an archive file;
- invoke the export logic component to determine whether the selected integration flow to be exported comprises a dependent connection or a dependent lookup;
- invoke the export logic component to selectively write the dependent connection to the archive file based on the export logic component determining selected integration flow to be exported comprises the dependent connection;
- invoke the export logic component to selectively write the dependent lookup to the archive file based on the export logic component determining selected integration flow to be exported comprises the dependent lookup; and
- invoke an export updater of the export logic component to selectively update a status of the dependent connection based on the export logic component determining selected integration flow to be exported comprises the dependent connection.

2. The system of claim 1, wherein the export interface is configured to:
invoke the export logic component to:
- select to be exported to the target environment an integration flow comprising one or more dependent connections, and one or more lookups; and
- export the selected integration flow together with the dependent connections and the lookups to the archive file.

3. The system of claim 1, wherein the export interface is configured to:
invoke the export logic component to:
- export the integration flow to be exported and its dependent sources regardless of lock states of the dependent resources.

4. The system of claim 1, wherein the export interface is configured to:
invoke the export logic component to update a status of any dependent connection in the integration flow to be exported; and invoke the export updater to update the status of the dependent connection as percentage complete information of the dependent connection.

5. The system of claim 1, wherein:
the source environment and the target environment are a same environment;
the export interface of the web interface application is configured to invoke the export logic to export an integration flow to be edited to the same environment to use advanced editing features on the integration flow to be edited in the same environment as an edited integration flow; and
the import interface of the web interface application is configured to invoke the import logic component to import the edited integration flow back to the web interface application.

6. The system of claim 1, wherein the import interface of the web interface application is configured to invoke the import logic component to detect that the integration flow selected for importing exists in the system and is not locked, and prompt a user to choose whether to overwrite the integration flow.

7. The system of claim 1, wherein the import interface of the web interface application is configured to invoke the import logic component to:
- determine that a dependent resource being imported is incompatible with the system;
- abort importing the integration flow to be imported based on the dependent resource being incompatible with the system; and
- roll back any changes made in the system relative to the dependent resource being imported based on the dependent resource being incompatible with the system.

8. A method for exporting and importing integration flows in a cloud-based integration service, the method comprising:
providing a cloud service, executing on a computer comprising a microprocessor, wherein the cloud service comprises a web interface application for creating an integration flow between a source application and a target application, and a runtime for executing the integration flow;
providing, in the web interface application, an import interface associated with an import logic component and an export interface associated with an export logic component;
receiving, at the import interface, a selection for an integration flow to be imported from a source environment;
invoking the import logic to perform a plurality of checks and validations for a dependent resource of the integration flow to be imported, to determine based on a presence of the dependent resource of the integration flow to be imported as an existing resource in the system whether to create the dependent resource of the integration flow to be imported as a new dependent resource or keep an existing dependent resource in the integration cloud service; and
receiving, via the export interface, a selection for an integration flow for exporting to a target environment, wherein the export interface is configured to:
- invoke the export logic component to write the selected integration flow to an archive file;
- invoke the export logic component to determine whether the selected integration flow to be exported comprises a dependent connection or a dependent lookup;

invoke the export logic component to selectively write the dependent connection to the archive file based on the export logic component determining selected integration flow to be exported comprises the dependent connection;

invoke the export logic component to selectively write the dependent lookup to the archive file based on the export logic component determining selected integration flow to be exported comprises the dependent lookup; and invoke an export updater of the export logic component to selectively update a status of the dependent connection based on the export logic component determining selected integration flow to be exported comprises the dependent connection.

9. The method of claim 8, wherein the export interface is configured to:
invoke the export logic component to:
select to be exported to the target environment an integration flow comprising one or more dependent connections, and one or more lookups; and
export the selected integration flow together with the dependent connections and the lookups to the archive file.

10. The method of claim 8, wherein the export interface is configured to:
invoke the export logic component to:
export the integration flow to be exported and its dependent sources regardless of lock states of the dependent resources.

11. The method of claim 8, wherein the export interface is configured to:
invoke the export logic component to update a status of any dependent connection in the integration flow to be exported; and
invoke the export updater to update the status of the dependent connection as percentage complete information of the connection.

12. The method of claim 8, wherein:
the source environment and the target environment are a same environment;
the export interface of the web interface application is configured to invoke the export logic to export an integration flow to be edited to the same environment to use advanced editing features on the integration flow to be edited in the same environment as an edited integration flow; and
the import interface of the web interface application is configured to invoke the import logic component to import the edited integration flow back to the web interface application.

13. The method of claim 8, wherein the import interface of the web interface application is configured to invoke the import logic component to detect that the integration flow selected for importing exists in the system and is not locked, and prompt a user to choose whether to overwrite the integration flow.

14. The method of claim 8, wherein the import logic component determines that a dependent resource being imported does not exist in the system and is incompatible with the system, and aborts the importing operation, and rolls back any changes.

15. A non-transitory computer-readable storage medium storing a set of instructions for exporting and importing an integration flow, said instructions, when executed by one or more processors, causing the one or more processors to perform steps comprising:

providing a cloud service, executing on a computer comprising a microprocessor, wherein the cloud service comprises a web interface application for creating an integration flow between a source application and a target application, and a runtime for executing the integration flow;

providing, in the web interface application, an import interface associated with an import logic component and an export interface associated with an export logic component;

receiving, at the import interface, a selection for an integration flow to be imported from a source environment;

invoking the import logic to perform a plurality of checks and validations for a dependent resource of the integration flow to be imported, to determine based on a presence of the dependent resource of the integration flow to be imported as an existing resource in the system whether to create the dependent resource of the integration flow to be imported as a new dependent resource or keep an existing dependent resource in the integration cloud service; and receiving, via the export interface, a selection for an integration flow for exporting to a target environment, wherein the export interface is configured to:
invoke the export logic component to write the selected integration flow to an archive file;
invoke the export logic component to determine whether the selected integration flow to be exported comprises a dependent connection or a dependent lookup;
invoke the export logic component to selectively write the dependent connection to the archive file based on the export logic component determining selected integration flow to be exported comprises the dependent connection;
invoke the export logic component to selectively write the dependent lookup to the archive file based on the export logic component determining selected integration flow to be exported comprises the dependent lookup; and
invoke an export updater of the export logic component to selectively update a status of the dependent connection based on the export logic component determining selected integration flow to be exported comprises the dependent connection.

16. The non-transitory computer-readable storage medium of claim 15, wherein the export interface is configured to:
invoke the export logic component to:
select to be exported to the target environment an integration flow comprising one or more dependent connections, and one or more lookups; and
export the selected integration flow together with the dependent connections and the lookups to the archive file.

17. The non-transitory computer-readable storage medium of claim 15, wherein the export interface is configured to:
invoke the export logic component to:
export the integration flow to be exported and its dependent sources regardless of lock states of the dependent resources.

18. The non-transitory computer-readable storage medium of claim 15, wherein the export interface is configured to:

invoke the export logic component to update a status of any dependent connection in the integration flow to be exported; and invoke the export updater to update the status of the dependent connection as percentage complete information of the dependent connection.

19. The non-transitory computer-readable storage medium of claim 15, wherein:

the source environment and the target environment are a same environment;

the export interface of the web interface application is configured to invoke the export logic to export an integration flow to be edited to the same environment to use advanced editing features on the integration flow to be edited in the same environment as an edited integration flow; and the import interface of the web interface application is configured to invoke the import logic component to import the edited integration flow back to the web interface application.

20. The non-transitory computer-readable storage medium of claim 15, wherein the import interface of the web interface application is configured to invoke the import logic component to detect that the integration flow selected for importing exists in the system and is not locked, and prompt a user to choose whether to overwrite the integration flow.

* * * * *